(12) United States Patent
Fujita et al.

(10) Patent No.: US 7,962,282 B2
(45) Date of Patent: Jun. 14, 2011

(54) LINK SETTING SYSTEM SUITABLE FOR MAP MATCHING, METHOD AND PROGRAM THEREOF

(75) Inventors: Takashi Fujita, Tokyo (JP); Enjian Yao, Tokyo (JP)

(73) Assignee: NEC Corporation, Tokyo (JP)

(*) Notice: Subject to any disclaimer, the term of this patent is extended or adjusted under 35 U.S.C. 154(b) by 1029 days.

(21) Appl. No.: 11/764,993

(22) Filed: Jun. 19, 2007

(65) Prior Publication Data

US 2008/0004804 A1    Jan. 3, 2008

(30) Foreign Application Priority Data

Jul. 3, 2006    (JP) .................................. 2006-183570

(51) Int. Cl.
*G06F 19/00* (2006.01)
*G08G 1/01* (2006.01)
(52) U.S. Cl. ..... 701/209; 701/213; 340/935; 340/995.19
(58) Field of Classification Search .................. 701/200, 701/207, 208, 209, 213, 205, 216, 224, 212, 701/202, 206, 210, 211; 340/988, 935, 995.28, 995.21, 995.19
See application file for complete search history.

(56) References Cited

U.S. PATENT DOCUMENTS

| 2006/0212216 A1* | 9/2006 | Kobayashi et al. ........... 701/207 |
| 2006/0224311 A1* | 10/2006 | Watanabe et al. ............. 701/208 |
| 2007/0239347 A1* | 10/2007 | Watanabe et al. ............. 701/200 |
| 2007/0273555 A1* | 11/2007 | Amano ......................... 340/935 |
| 2009/0326809 A1* | 12/2009 | Colley et al. .................. 701/208 |

FOREIGN PATENT DOCUMENTS

| JP | 2004/226341 | 8/2004 |
| JP | 3596939 | 9/2004 |

* cited by examiner

*Primary Examiner* — Ronnie Mancho
(74) *Attorney, Agent, or Firm* — Young & Thompson

(57) ABSTRACT

In order to eliminate erroneous map matching, when a link is set on a road, the direction and distance the link is displaced are calculated in accordance with the width of the road and the width of a road paralleled to the road, or the positional relationship of both roads in road network.

6 Claims, 6 Drawing Sheets

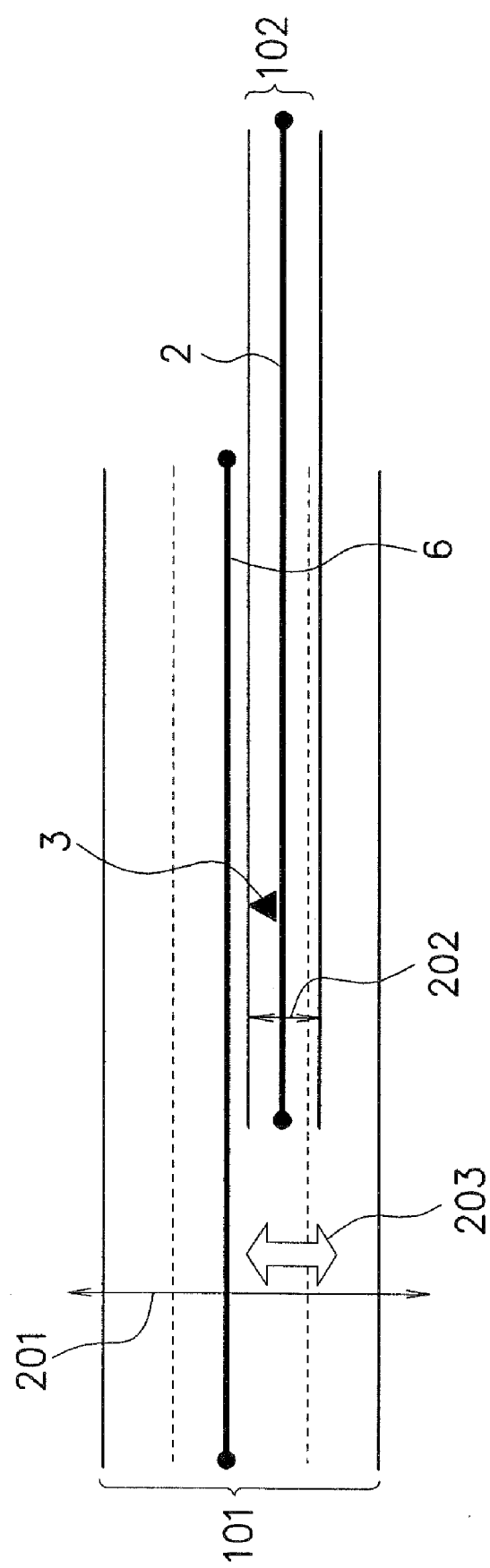

LINK SETTING SYSTEM SUITABLE FOR MAP MATCHING, METHOD AND PROGRAM THEREOF

This application is based upon and claims the benefit of priority from Japanese patent application No. 2006-183570, filed on Jul. 3, 2006, the disclosure of which is incorporated herein in its entirety by reference.

BACKGROUND OF THE INVENTION

1. Field of the Invention

The present invention relates to a method of setting a link for eliminating erroneous map matching in a map matching system that identifies the road on which a vehicle is traveling based on current location information acquired by on-board equipment mounted on the vehicle.

2. Description of Related Art

Conventionally, map matching processing, which processes the information from various sensors to estimate and match the current location of a traveling vehicle on a road on a map, is performed by a car navigation system or at an information center which receives sensor information through telecommunication, and the result of which has been utilized for route guidance, traffic information provision, and so on. However, there have been cases in which incorrect map matching takes place in areas where there are multiple paralleling roads with a different road width or where a road network is complicated.

That is, when the on-board equipment to be mounted on the vehicle is a navigation system, the current position of the vehicle is calculated from the moving direction of the vehicle measured by a directional sensor such as a gyroscope, and the travel distance measured by a speed sensor or a distance sensor.

In addition, the information from GPS is also utilized to obtain an accurate current location thereby identifying the location of the traveling vehicle on a road so that a mark indicating the current location is displayed on a road on a map of the car navigation system.

A technique that calculates a current location of a vehicle and corrects the calculated location of the vehicle by identifying the road on which the vehicle is traveling is called a map matching technique.

When the on-board equipment is not a car navigation system but consists of a GPS alone without autonomous navigation, the information from which the current location of the vehicle is calculated is that of the GPS only, and it is difficult to accurately calculate the current location of the vehicle due to large position error of the GPS.

And when the on-board equipment consists of a GPS alone, GPS information is likely to be transmitted through telecommunication to an information center where an estimated vehicle location on a road on a map is calculated.

Whether the on-board equipment consists of a car navigation system or of a GPS alone, the map matching technique to estimate the current location of a vehicle on a road is generally performed as follows.

When a current location of the vehicle estimated based on the information from various sensors including a GPS is not on a road on a map, the modified location is decided as follows: a perpendicular is drawn from the current location toward a road near the current location and the intersection of the two lines is the modified location. A road on a map is represented as a line segment called a link that has no width as described below.

That is, a road on a map is represented as line segments, for example, divided at a crossroad. A line segment is generally called a "link", each of which is given a link number. A road is identified either by setting a link for each direction of a road corresponding to the traveling direction of the vehicle, or setting a single link for both directions of the road and adding a traveling direction as associated information. A link that has no width is set at the center of the road.

In an area where there are paralleling roads, i.e. where links are aligned in parallel to each other, there has been risk that an adjacent road different from the actual road is map-matched due to the measurement error of the current location. In particular, when a wide road and a narrow road are aligned in parallel, it has been highly likely that even though the vehicle is running on the wide road, the location of the vehicle is projected closer to the link for the narrow road than to the link for the wide road, and thus the location of the vehicle is map-matched onto the link of the narrow road.

Thus, there has been risk that erroneous information is generated when a wrong road is map-matched and based on that information road traffic information is generated at an information center. A car navigation system could also give a driver incorrect road guidance.

To solve this problem, Japanese Patent No. 3596939 (document 1) describes a method for avoiding erroneous map matching by setting a threshold for the distance (length of the perpendicular) from the current location of a vehicle to a candidate road nearby to be selected in accordance with road width thus taking into consideration the influence of the road width.

Further, Japanese Patent Application Laid-Open No. 2004-226341 (document 2) describes a method of preventing erroneous map matching for a vehicle traveling on a lane, which is closer to another paralleling road, of a wide road having multiple lanes by setting a virtual link for each lane of the road.

However, those techniques have had following problems.

There has been a problem with document 1 in that satisfactory map matching may still not be achieved, and document 2 in that setting multiple virtual links for a road requires several times more processing time for map matching.

Document 2 also describes a method in which only one virtual link is set thus providing one virtual link for one road. However, when there are three paralleling roads, the middle road has two outer virtual links, thereby still affecting processing time. There has been also a problem that when a vehicle is map-matched only to the outer virtual links, the data for a vehicle traveling near the center of a road may not be matched correctly if the road is broad. There has been also a problem in that when the outer virtual link is set based on the road width alone, a multi-layered road may be given wrong links, thereby causing a problem in map matching.

SUMMARY OF THE INVENTION

An exemplary object of the invention is to eliminate erroneous map matching.

According to an exemplary aspect of the invention, there is provided a link setting system suitable for map matching, in which a link is set at an optimum position on a road in light of road width and road network.

BRIEF DESCRIPTION OF THE DRAWINGS

Features of the disclosed embodiments will be described by way of the following detailed description with reference to the accompanying drawings in which:

FIG. 9 shows a concept of a second embodiment.

DESCRIPTION OF EXEMPLARY EMBODIMENTS

Now, exemplary embodiments will be described in detail with reference to the drawings.

Figure 1:
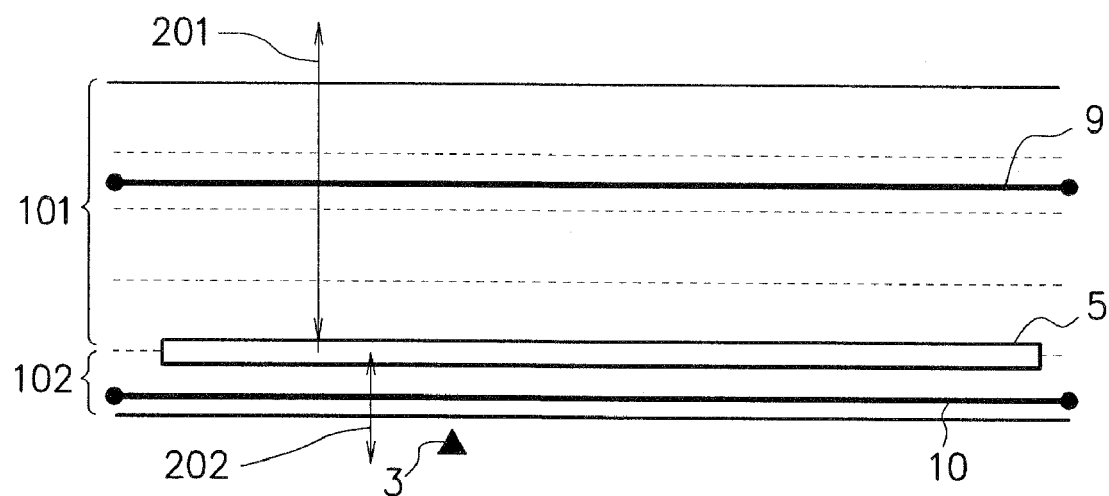
FIG. 1 shows a concept of a first embodiment.

A link setting system suitable for map matching according to a first embodiment may be applied to roads as shown in FIG. 1 that includes a broader trunk road 101, a local road 102 parallel to the trunk road 101, and a separating zone 5 between the roads 101 and 102. The system calculates a direction in which a link is displaced, and a distance by which a link is displaced in accordance with not only a road width but also on a road network (i.e. widths and positional relation ship of paralleling roads), and sets links 9 and 10, and map matching thresholds 201 and 202. No overlap appears between the map matching threshold 201 for the trunk road 101 and the map matching threshold 202 for the local road 102, and map matching can be performed even when the current location 3 is near the local road 102.

Figure 2:
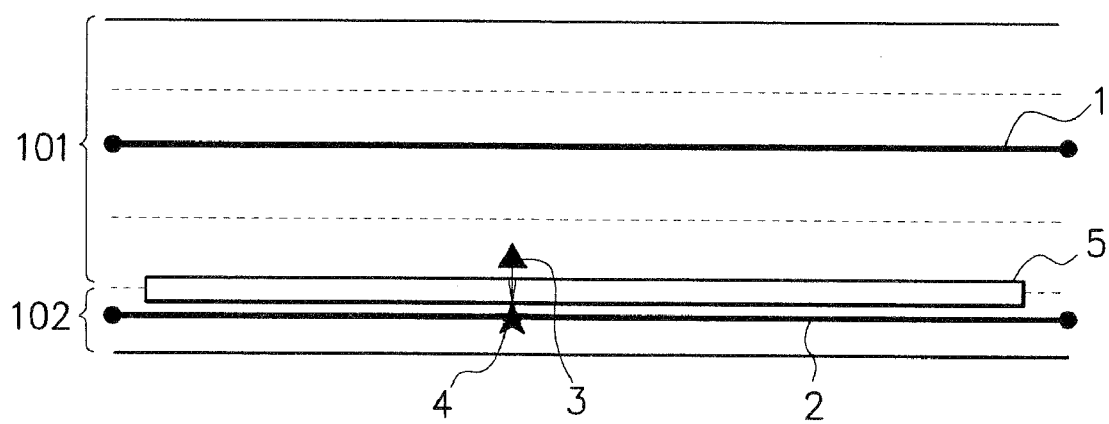
FIG. 2 shows a concept of the first embodiment.

According to this embodiment, it is possible to solve problems described below. In FIG. 2, the trunk road 101 with a larger width and the local road 102 with a smaller width run in parallel to each other, and for each of the roads a link 1 and a link 2 are set respectively.

It is general that the link 1 is set around at the center of the trunk road 101 while the link 2 is set at the center of the local road 102.

When a vehicle is traveling on an outer lane of the trunk road 101, i.e. the lane closer to the local road 102, a vehicle location 3, which is obtained through GPS information from the vehicle, mostly falls on the outer lane of the trunk road 101 although the location 3 may contain positional error due to a GPS.

When this vehicle location 3 is map-matched, a location of the vehicle will be given on the link 2, which lies at a shorter distance from the vehicle location 3.

The current location of the vehicle in this case becomes current position 4, and thus it will be determined that the subject vehicle is traveling on a paralleling road (local road 102) different from the actual traveling road (trunk road 101).

Figure 3:
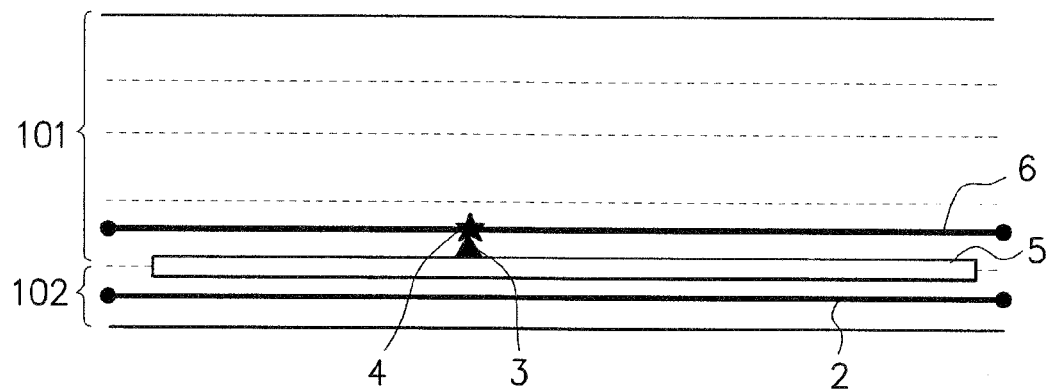
FIG. 3 shows a concept of the first embodiment.
Figure 4:
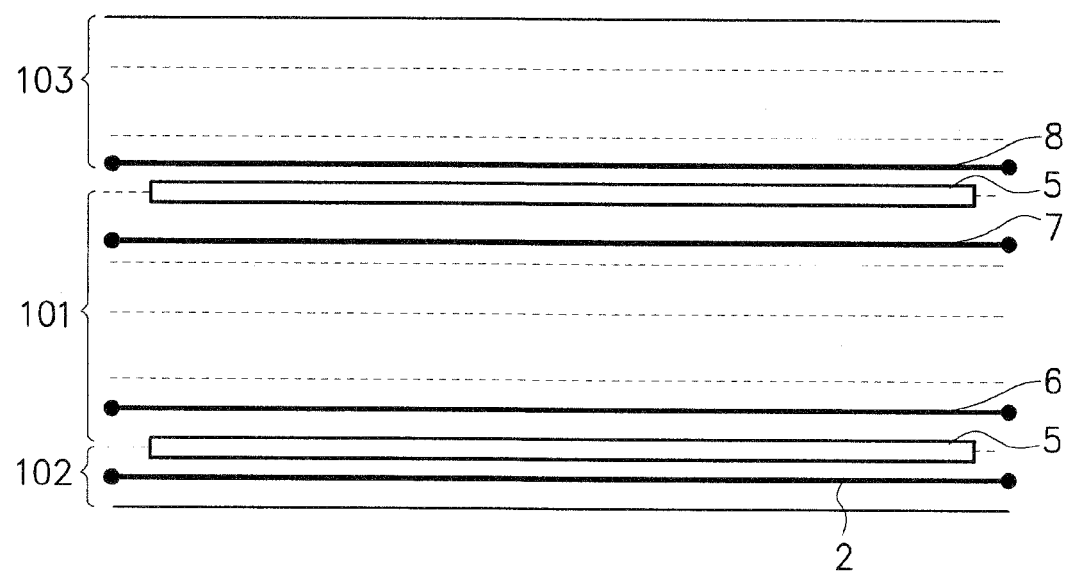
FIG. 4 shows a concept of the first embodiment.

Document 2 mentioned above discloses that the above described problem can be avoided by displacing the link of the trunk road 101 closer toward the local road 102, thereby setting a link 6 as shown in FIG. 3. However, when there are three paralleling roads as shown in FIG. 4, although there will be no problem with the roads (102, 103) on both sides, if the link is displaced as shown by a link 2 and a link 8, it becomes necessary for the middle trunk road 101 to have multiple links such as shown by a link 6 and a link 7. Thus, map matching processing time will become an issue due to the increase in the number of links.

Figure 5:
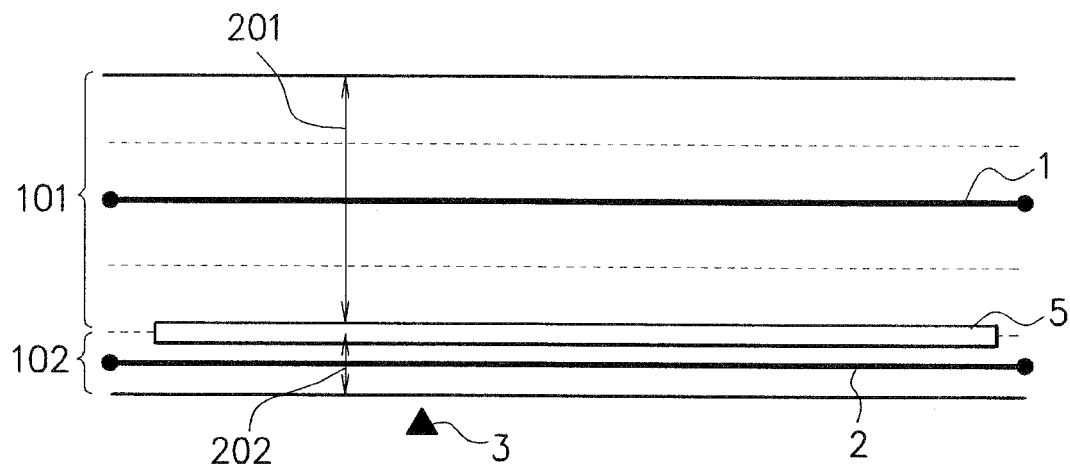
FIG. 5 shows a concept of the first embodiment.

On the other hand, document 1 mentioned above proposes a method in which the map matching threshold between the current location and the link to be map-matched is varied in accordance with the road width in stead of displacing the position of the link in light of the road width. In this method, in which the map matching threshold 201 (represented as a distance) for the trunk road 101 is increased while the map matching threshold 202 for the local road 102 is decreased as shown in FIG. 5, since the thresholds are to be set without taking into consideration GPS position error, there has been a problem that current location 3 may not be map-matched even when it is located near the local road 102 of a smaller width.

Figure 6:
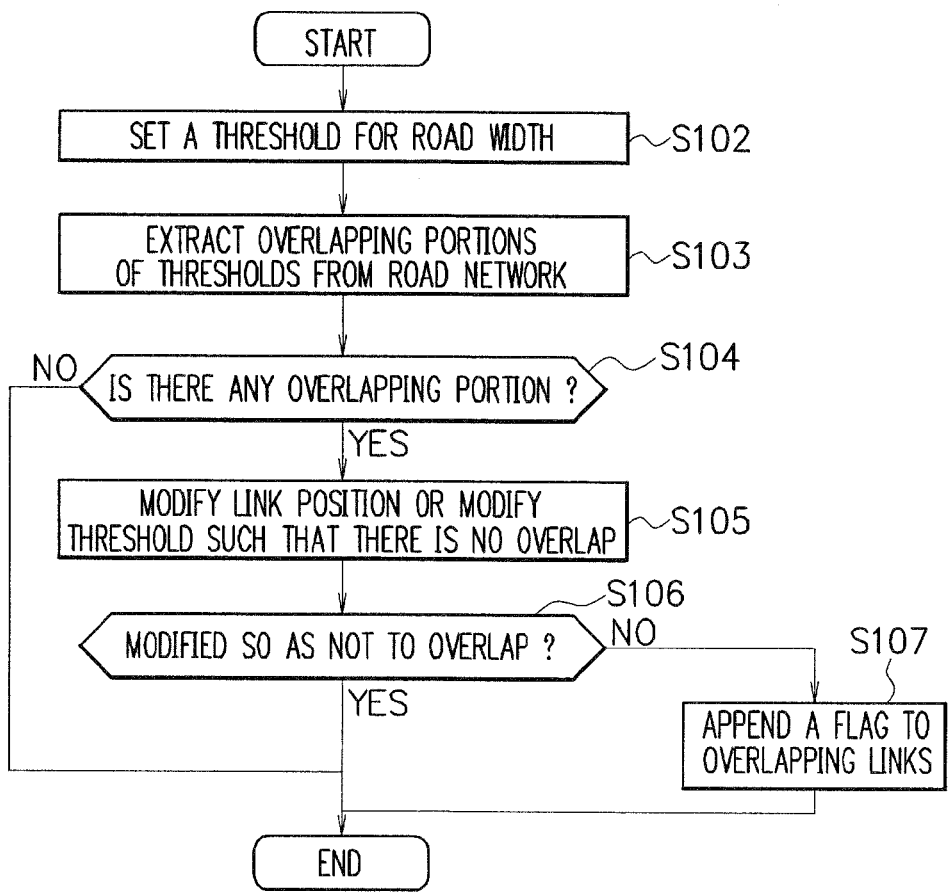
FIG. 6 is a flow chart to show an operation in the first embodiment.

Next, an operation will be described with reference to FIG. 6.

First, a map matching threshold is set based on the road width information of a road map (S102). The setting of the threshold value at this moment is determined taking into consideration the error in the current location of the vehicle acquired by on-board equipment. This processing means in a sense that a link that has no line width is given a line width in accordance with the road width and the error in the on-board equipment.

From this result, any overlapping portion between links is extracted (S103).

If there is an overlapping portion (S104), the link position is shifted and the threshold is modified such that there is no overlap between links (S105).

In the areas where overlap of links is not eliminated by the above processing, a processing of appending a flag as additional information of the link to indicate the existence of an overlap is performed (S107).

Figure 7:
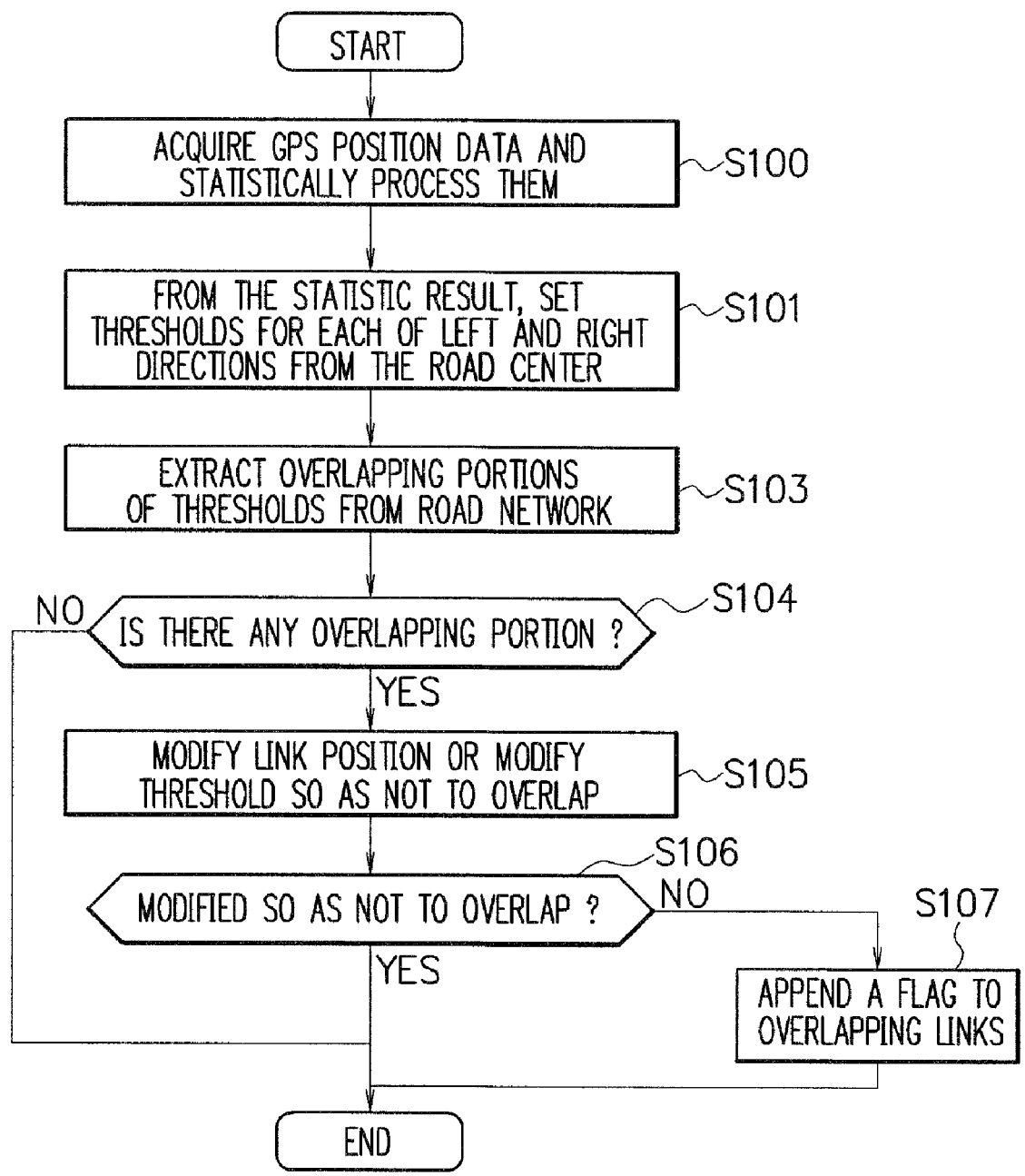
FIG. 7 is another flow chart to show an operation in the first embodiment.

Further, when map matching is performed at an information center, since a large amount of vehicle location data are gathered and accumulated from multiple vehicles, by performing a statistical processing from the accumulated information (S100) and setting the map matching threshold from the results (S01) as shown in FIG. 7, it becomes possible to set thresholds taking into consideration not only a road width and the positional relationship of roads, but also the trend of current position information specific to each area.

As set forth above, it is possible to perform accurate map matching without increasing the processing time even in the areas where multiple roads with a different road width run in parallel to each other or road network is complicated and where there are cases in which incorrect map matching takes place.

Next, the second embodiment will be described with reference to FIG. 8.

Figure 8:
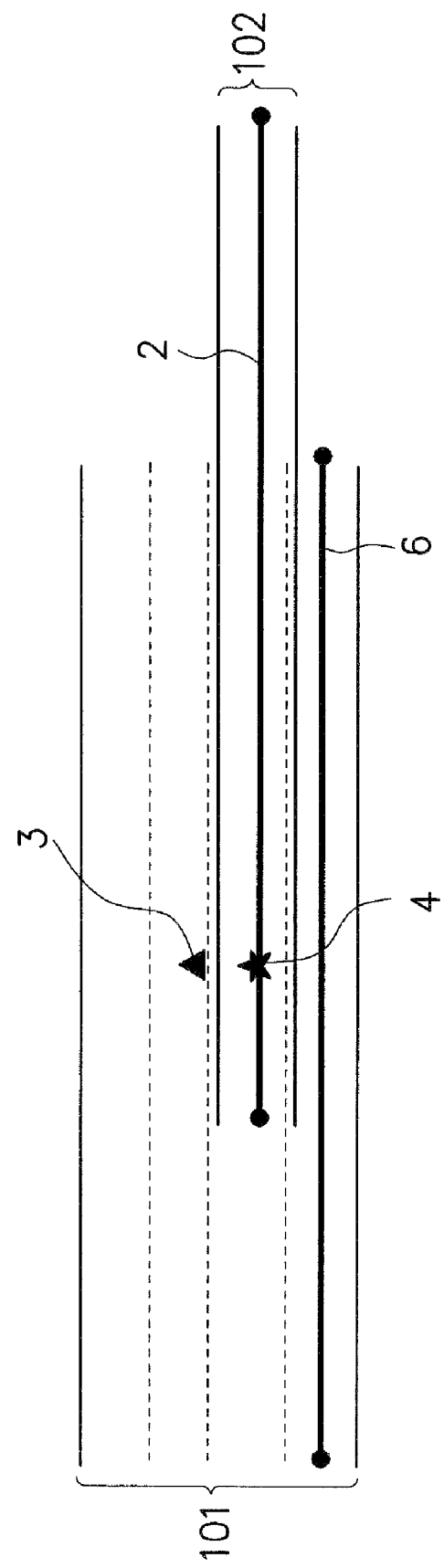
FIG. 8 shows a concept of a second embodiment.

In an area where the trunk road 101 and the local road 102 are disposed in a multi-layered fashion as shown in FIG. 8, if the link of the trunk road 101 is displaced outwardly and set to link 6, its positional relationship with the local road 102 may be reversed and the vehicle location will be map-matched to the link 2 of the local road 102 even though the vehicle is running on the trunk road 101.

Further, in an area where the road has a multi-layered structure as shown in FIG. 9, since it is inevitable that there is an overlap between the map matching thresholds 201 and 202, when the current location 3 is located at a position 203 where the map matching thresholds overlap, GPS information is less likely to be acquired on the lower layer road, and thus it is possible to perform a correct map matching by appending an attribute of the map matching priority to the associated information of the link that is in the upper layer in the positional relationship of the roads.

Moreover, each embodiment described above is exemplary embodiments, to which various modifications may be made. For example, the processing according the above described embodiments may be implemented by causing one or more devices in a system to read and execute a program for implementing functions of the link setting system suitable for map matching. Moreover, the program may be transmitted by a carrier wave to other computer systems or via a CD-ROM or magneto-optical disc that is a computer-readable recording medium, or via the Internet, telephone line, or the like that is transmission medium.

Third Exemplary Embodiment

As a further exemplary embodiment, a link setting system suitable for map matching is provided. When a link is set on a road, the direction and distance the link is displaced are calculated in accordance with the width of a road and the width of another road paralleled to the road, or the positional relationship of both roads in road network.

Fourth Exemplary Embodiment

As a further exemplary embodiment, there is provided a method of setting links suitable for map matching, in which a link is set at an optimum position on a road in light of road width and road network.

Fifth Exemplary Embodiment

As a further exemplary embodiment, a method of setting links suitable for map matching is provided. When a link is set on a road, the direction and distance the link is displaced are calculated in accordance with the width of the road and the width of a road paralleled to the road, or the positional relationship of both the roads in road network.

An exemplary advantage according to the invention is that it is possible to eliminate erroneous map matching.

Although each of the embodiments has been described relating to the configuration in which the link setting system suitable for map matching is implemented as a single computer system, it is obvious that the embodiments can be applied to configurations in which multiple devices are added for each function.

The embodiments may be applied to the fields of processing of the GPS position information of a traveling vehicle to be displayed on the map of a car navigation system, and the generation of road traffic information utilizing the aforementioned information.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A method of setting links suitable for map matching, comprising:
   in a map matching system comprised representing a road network with at least a first road and a second road, the second road parallel to the first road, the first road having a first width different from a second width of the second road, a separating zone existing between the first and second roads,
   upon setting a first link on the first road, giving said first link a width in accordance with the first width of said first road and an error in a current location of the first link as acquired by on-board equipment;
   upon setting a second link on the second road, giving a width to the second link in accordance with the second width of the second road and an error in a current location of the second link as acquired by the on-board equipment;
   extracting an overlapping portion between the first and second links;
   calculating a shifting direction and a shifting distance so that no overlap appears between the first and second links; and
   shifting one of the first and second links based on the calculated shifting direction and calculated shifting distance so that there is no overlap between the first and second links.

2. A link setting system suitable for map matching, wherein when a first link is set on a first road, a direction and a distance said first link is displaced are calculated by i) giving said first link a width in accordance with a width of said first road and an error in a current location acquired by on-board equipment, and ii) giving a width to a second link on a second road parallel to said first road in accordance with a width of the second road parallel to said first road, and an error in a current location acquired by the on-board equipment, and iii) calculating a direction and a distance each of said first link and said second link on the second road parallel to said first road is displaced so that no overlap appears between the first and second links.

3. The link setting system suitable for map matching according to claim 2, wherein the direction and distance a link is displaced are determined depending on each road by statistically processing GPS positional data acquired.

4. A computer readable medium having stored thereon a series of instructions that can be read by a computer thereby to cause said computer to perform the method of claim 2.

5. A method of setting links suitable for map matching, comprising:
   when a first link is set on a first road, calculating a direction and a distance in and by which the link is displaced, said calculating including:
   giving said first link a width in accordance with a width of said first road and an error in a current location acquired by on-board equipment;
   giving a width to a second link on a second road parallel to said first road in accordance with a width of the second road parallel to said first road, and an error in a current location acquired by the on-board equipment, and
   calculating a direction and a distance each of said first link and said second link is displaced so that no overlap appears between the first and second links.

6. The method of setting links suitable for map matching according to claim 5, wherein the direction and distance a link is displaced are determined depending on each road by statistically processing GPS positional data acquired.

* * * * *